Dec. 21, 1926.  
W. E. SHEENE  
1,611,287  
METHOD OF MOLDING BURIAL VAULTS AND MOLD THEREFOR  
Filed May 23, 1924  4 Sheets-Sheet 2
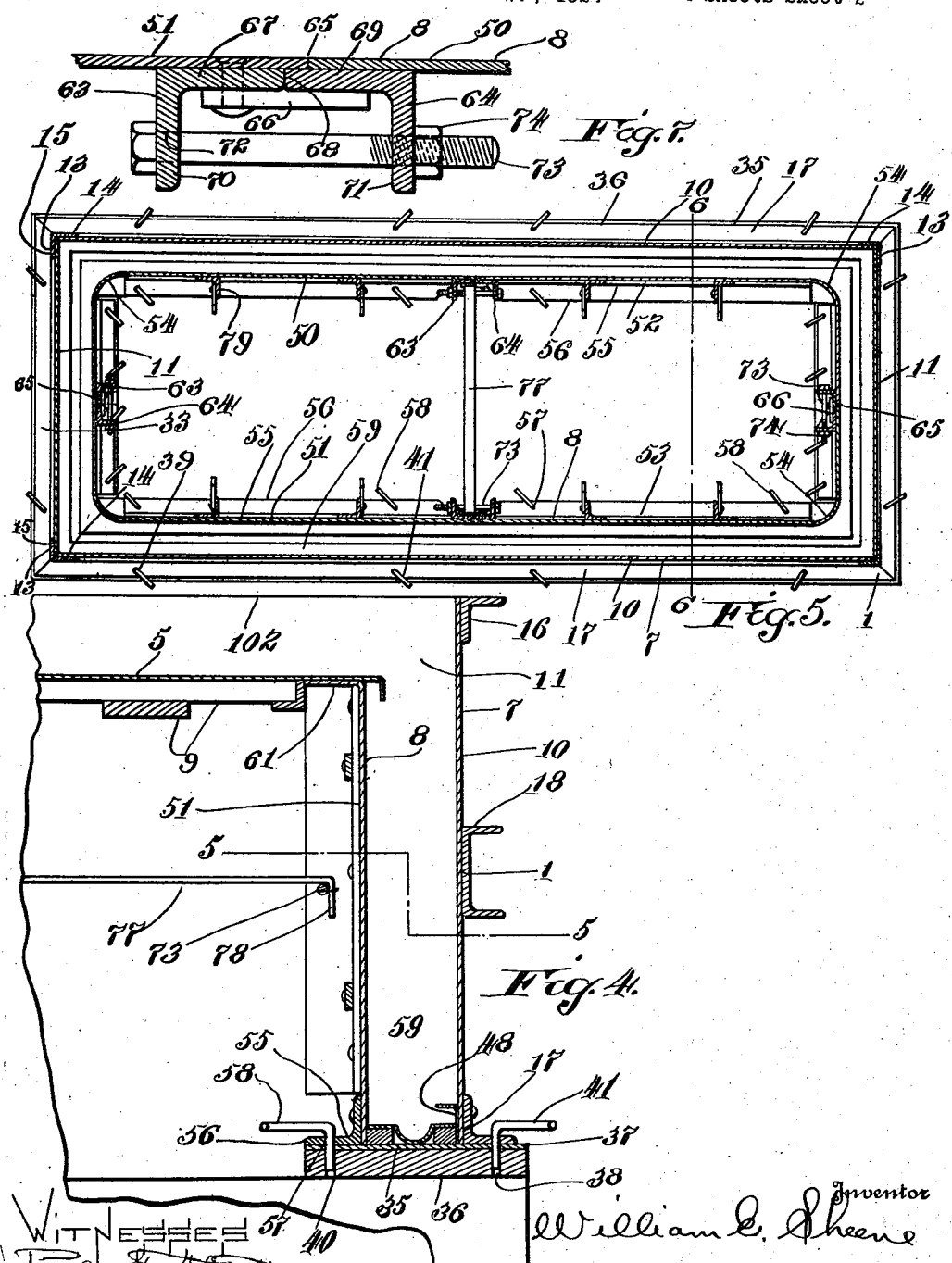

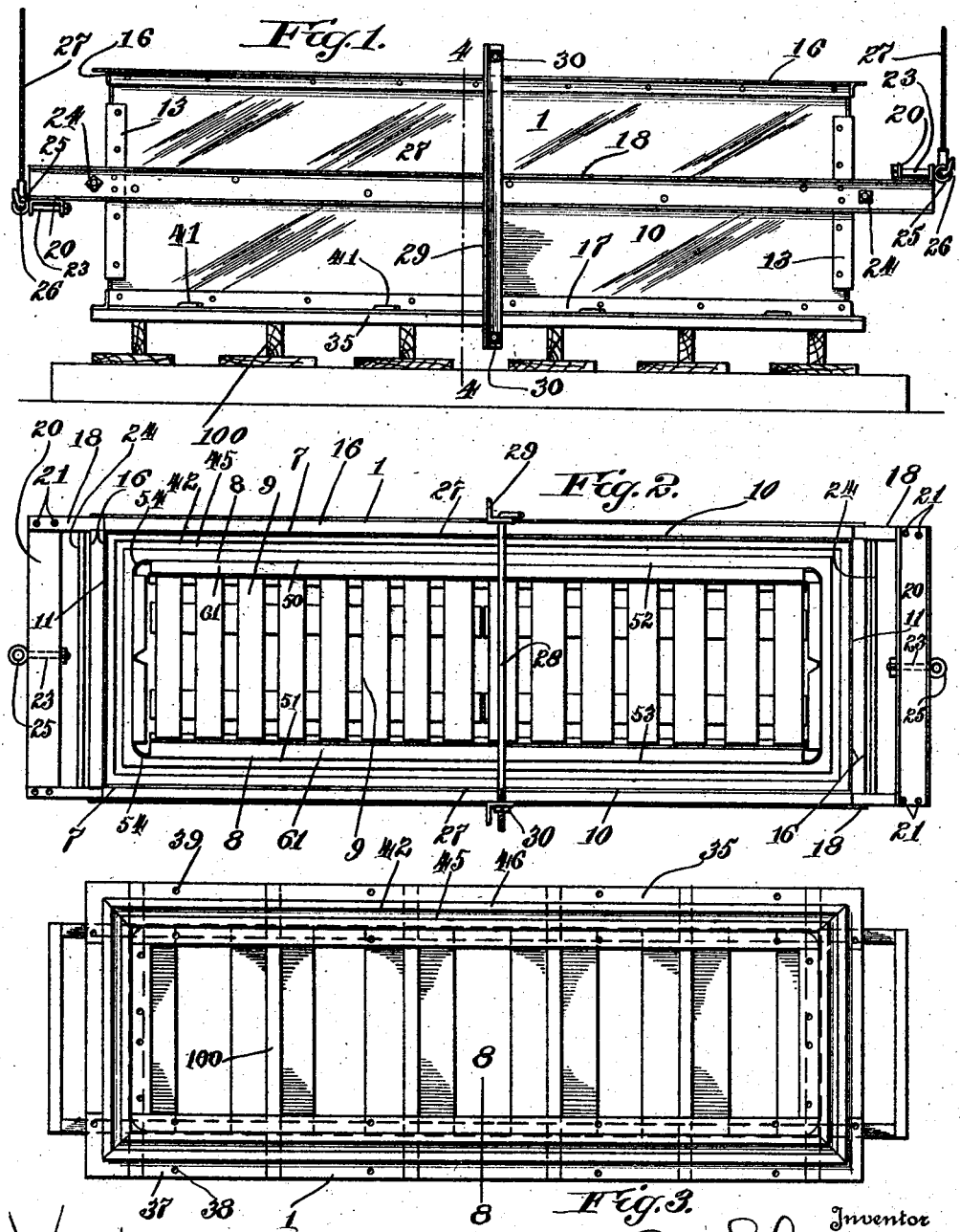

Dec. 21, 1926.
W. E. SHEENE
1,611,287
METHOD OF MOLDING BURIAL VAULTS AND MOLD THEREFOR
Filed May 23, 1924      4 Sheets-Sheet 3
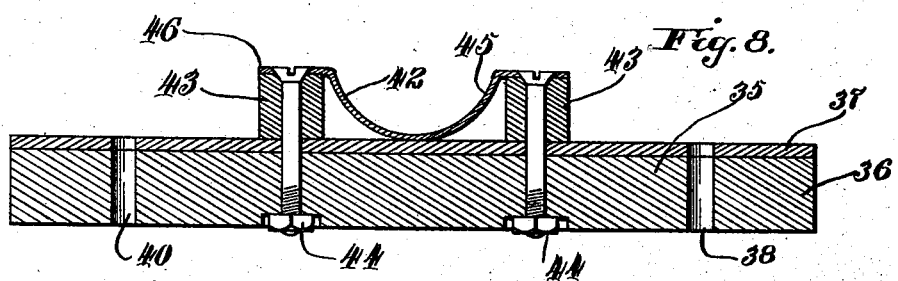
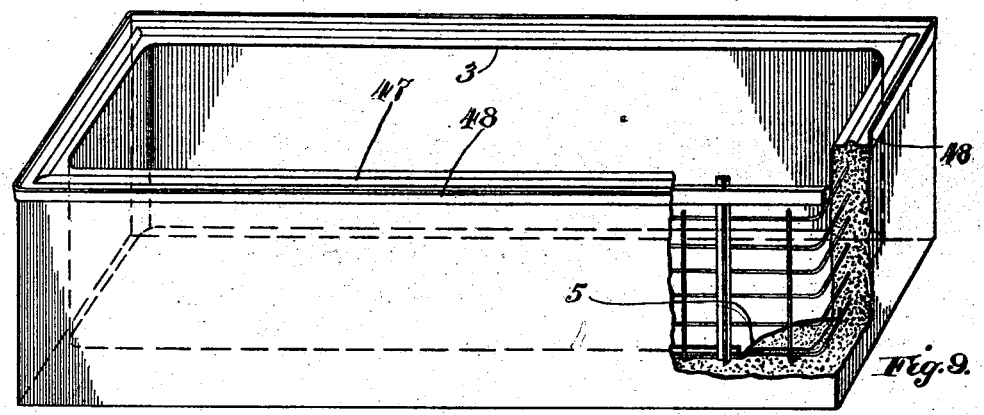
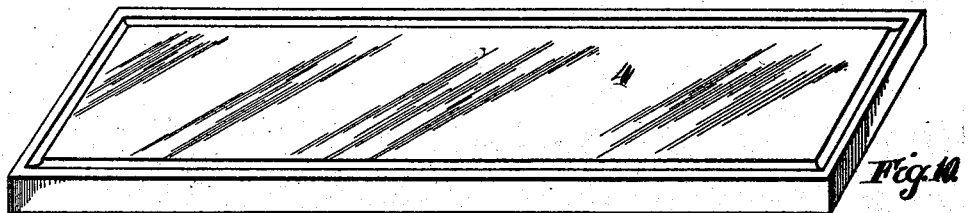
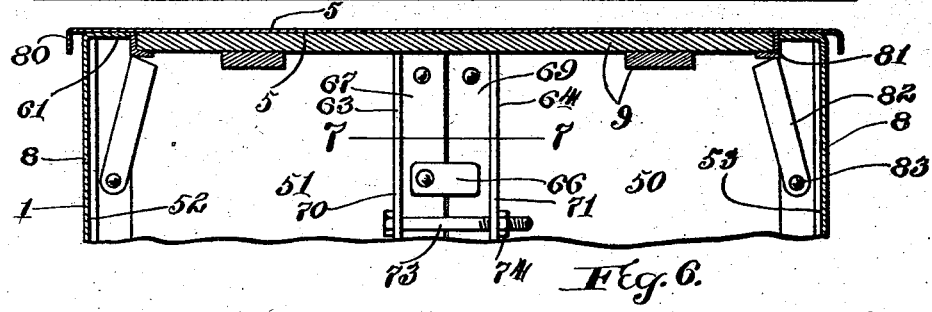
Inventor
William E. Sheene
By Edwin Samuels
Attorney Dec. 21, 1926.
W. E. SHEENE
1,611,287
METHOD OF MOLDING BURIAL VAULTS AND MOLD THEREFOR
Filed May 23, 1924     4 Sheets-Sheet 4
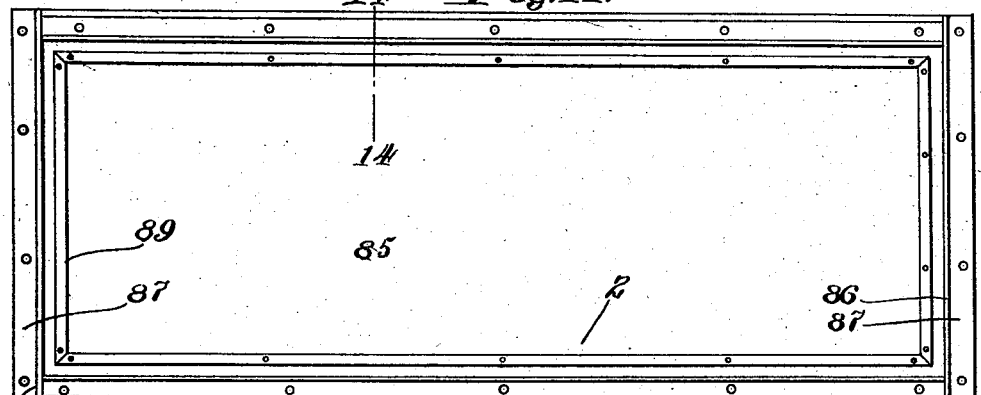
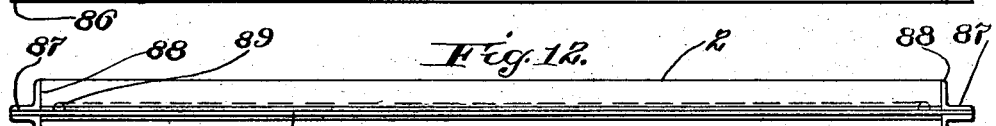
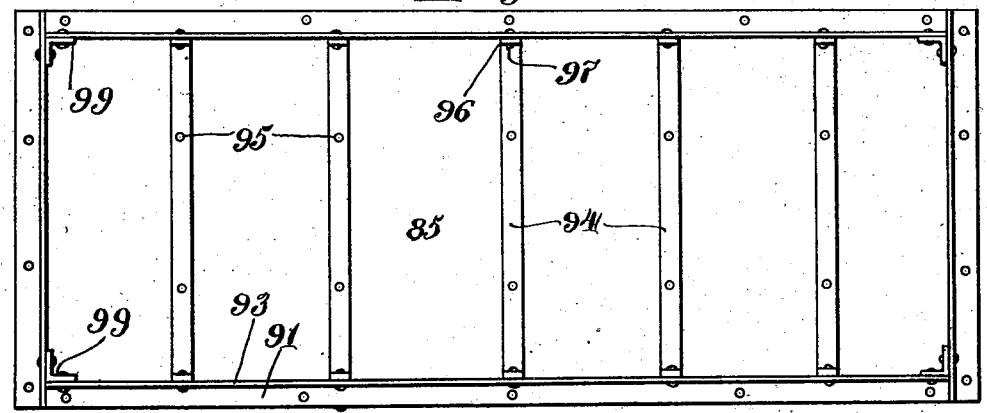
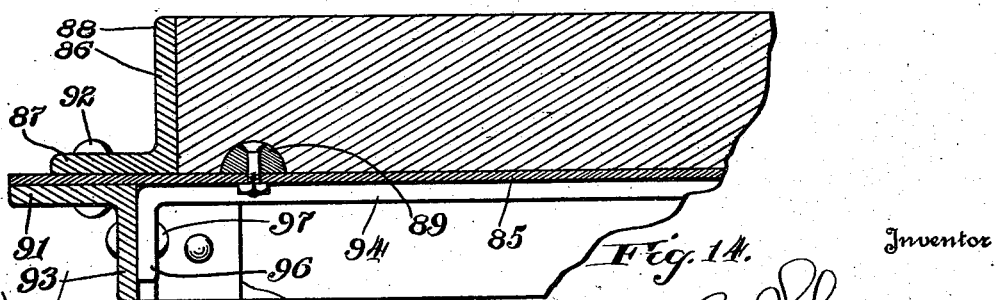
Inventor
William E. Sheene
By Edwin Hummels
Attorney
Witnesses Patented Dec. 21, 1926.

1,611,287

UNITED STATES PATENT OFFICE.

WILLIAM E. SHEENE, OF BALTIMORE, MARYLAND, ASSIGNOR TO THE ASPHALT GRAVE VAULT COMPANY, A CORPORATION OF MARYLAND.

METHOD OF MOLDING BURIAL VAULTS AND MOLD THEREFOR.

Application filed May 23, 1924. Serial No. 715,284.

The invention relates to the manufacture of asphalt caskets as illustrated herein, and in my Patents Nos. 1,560,106 and 1,560,107, patented Nov. 3, 1925.

The casket in the preferred form is reinforced by means of a suitable metal frame and is produced by placing the frame in the mold which is the subject of the present invention, and pouring a melted asphalt mastic into the mold about the frame. The invention to be described relates particularly to the construction and operation of a mold particularly adapted to the production of the type of asphalt vault described in the aforesaid applications, and to the method of molding the vault which is peculiar in that the vault has a metal lining which is anchored in the asphaltic material at the edges and which in effect forms one wall of the mold, greatly simplifying the operation of removing the mold from the completed vault.

The invention also relates to the construction of the mold including the knock-down features which make it feasible to remove the mold in sections from the interior of the vault further obviating the difficulties incident to drawing.

In the accompanying drawings I have illustrated a mold embodying the features of my invention in the preferred form, and the vault manufactured therein in the practice of the method of my invention.

In the drawings—

Figure 1 is a side elevation of the vault mold in molding position.

Figure 2 is a top plan of the same with the grid which supports the bottom lining of the vault in position.

Figure 3 is a plan of the bottom frame of the mold with the sides removed.

Figure 4 is a fragmentary transverse section on the line 4, 4 of Figure 1.

Figure 5 is a horizontal section through the mold on the line 5, 5 of Figure 4.

Figure 6 is a fragmentary transverse section on the line 6, 6 of Figure 5.

Figure 7 is a section on the line 7, 7 of Figure 6, illustrating the manner of joining the mold sections forming the inner molds at the sides and ends.

Figure 8 is a section on the line 8, 8 of Figure 3 illustrating the bottom frame of the mold.

Figure 9 is a perspective view of a vault constructed by means of the mold and in accordance with the invention.

Figure 10 is a perspective view of the vault cover inverted.

Figure 11 is a plan of the cover mold looking at the inside of the mold.

Figure 12 is a side elevation of the same.

Figure 13 is a bottom plan of the cover mold; and

Figure 14 is a section on the line 14, 14 of Figure 11.

Referring to the drawings by numerals, each of which is used to indicate the same or similar parts in the different figures; the apparatus illustrated includes a vault mold 1, a cover mold 2, a vault 3, a vault cover 4, and a vault bottom lining plate 5.

The vault mold 1 consists of an outer mold wall 7 and an inner mold wall 8, and the bottom grid 9 which is spaced downward slightly from the top of the outer mold wall, as shown in molding position, serving to support the bottom lining 5 of the mold during the molding operation. The outer mold wall 7 is made in four sections comprising the two elongated side members 10, 10 and the ends 11. These are positioned relatively at the corners by vertical angle irons 13 secured in vertical position to the end edges of the side members, and having one flange overlap the edges of the side members at 14 and having the other flange 15 spaced off from the side members so as to provide for the entrance of the edges of the end members between the corner of the angles and the end edges of the side members. The top and bottom edges of the side members or walls 10 and of the end members or walls 11 are supported by angle irons 16 at the top secured to the edges of the material along the top of the said plates, and 17 secured to the bottom edges, it being understood that the sides of the mold are made of thin sheet steel. The side plates 10, 10 are also provided with longitudinal supports 18, 18 in the form of channel irons extending horizontally along the sides and secured to the plates by riveting as shown or in any suitable manner. These longitudinal supports 18 extend beyond the side plates at each end and hence beyond the ends of the mold as set up in molding position as hereinafter described, and are connected beyond the ends by cross-bars 20 in the form of channels each extending from one support 18 to the other and secured thereto temporarily in any suitable manner as by means of bolts 21 passing through both members. The longitudinal supports 18 are also connected by transverse tension members or rods 24 at each end outside the ends of the molds. These tension rods extend through the channels 18 forming the longitudinal supports and serve to draw the supports together, tightening the outside mold in assembled position, and the transverse bars or supports 20 are provided with eyes 25 on pins or bolts 23 in the long axis of the vault mold, projecting outward in a horizontal direction from the centres of the cross-bars for engagement by a hoisting hook 26 and tackle 27 for hoisting the mold at any time and particularly for hoisting the mold when the vault has been completed in order that it may be turned over for the convenient removal of the mold parts, and to this end, i. e., to facilitate turning, I have shown the cross-bars 20 and the eyes 25 secured one to the upper and the other to the lower side of the longitudinal supports 18, and the bolts 23 are preferably mounted to rotate.

Tension is also applied transversely to the outer side walls 27 by means of transverse rods 28, one above the top of the side walls and the other beneath the bottom connecting removable vertical angle irons or other suitable beams 29 at their upper and lower ends, the bolts or rods 28 being taken up by nuts 30 outside the angle irons. As shown, the angles 29 are not connected to the side walls but are held in position during molding only by the tension of the bolts 28 and are removed when the mold is taken down to draw the finished vault.

The bottom of the mold which is referred to more descriptively as the bottom mold frame 35 shown in top plan in Figure 3 and in cross-section in Figure 8, is of particular interest, having the function of assisting in holding the mold parts in assembled position, and also the function of forming the top edge of the vault which is poured in inverted position. This bottom frame, which is elongated rectangularly in accordance with the top plan of the finished vault, is formed of wooden strips or boards 36 as shown by the cross-section, Figure 8, preferably covered on top by a heavy straight strip of sheet steel 37 and provided with a line of holes 38 on one side corresponding to and registering with holes 39 in the angle irons 17 at the bottoms of the outside walls, and a line of holes 40 on the other side registering with corresponding holes in angles at the bottom edges of the inside mold to be described.

Secured to the centre of the bottom frame and extending along each of the four sides, is a U-shaped form 42 which as shown consists of two longitudinal strips 43 secured to the frame members 36, 37 by any suitable means as screw bolts 44 and secured to these strips 43 I have shown a U-shaped channel member 45 of sheet steel having flat edge portions or flanges 46 overlying and secured to the strips 43 by means of the bolts 44, the heads of which are counter-sunk therein. The channel member 45 has a longitudinal channel or depression which as shown is semi-circular, this form being the preferred form and not essential to the invention. The member 42 forms the U-shaped rib 47 extending entirely around the top edge of the vault as shown in Figure 9. The rib 47 also supports the sealing strip 48 which is a steel band projecting above the top of the finished vault to hold sealing material. It is held between the rib 47 and the walls 7, as shown, and molded into the vault. It is L-shaped with the flange projecting into the vault material.

The inner mold wall 8 as well as the outside mold is formed in four sections so that the inner wall may be knocked down and removed from the inside of the vault, but these sections 50, 51, 52, 53 meet intermediately of the side and ends instead of being joined at the corners as are the outer walls, the difficulty incident to removing the wall sections which extend the full length of one side being thus overcome. The inner mold walls like the outer mold walls are made of sheet steel, being preferably rounded at the corners at 54 for convenience in disengaging them from the molded material in drawing, each section 50, 51, etc. being formed of a single sheet extending from the centre of one side around the corner to the centre of one end. These inner walls in the preferred structure shown are stiffened by means of angle irons 55 having one flange secured to and extending along the bottom edge of the plate on the side thereof away from the mold space 59, the other flange 56 being horizontal and provided with holes 57 registering with holes 40 in the bottom frame member 35, 36 and secured thereto by pins 58 extending through the holes. The plate forming the inside wall 8 of the mold is stiffened at the top by means of a flange 61 which in the form of the invention shown is formed by turning over the edge of the plate. In the structure shown these flanges are discontinued at the corners for convenience in bending the plate to form the mold. The preferred manner of forming the meeting edges of the sections of the inner mold is illustrated in Figure 7, which is a horizontal section on the line 7, 7 of Figure 6 but may be treated as taken through any one of the mold joints. The joint consists of angle irons 63, 64, each having a flange secured to and extending along one of the adjacent vertical edges of the mold sections, the other flange extending outward at right angles, i. e., away from the mold space, the angles being secured to the side of the walls remote from the mold space, so that these flanges are in fact turned inward into the enclosure formed by the inner wall of the mold. The angle 64 is secured to the edge of the mold section 50 at the centre of the lefthand end of the mold, as seen in Figure 5, the angle 63 being secured to the corresponding and adjacent edge of the mold section 51. Preferably the edge of the angle 63 is spaced back from the edge 65 of the section 51, and a plate or button 66 is pivoted to the flange 67 of said angle. The edge of the angle 63 and the protruding edge 65 of the plate 51 form a groove or rabbet 68 to receive the edge of the flange 69 of the angle 64 which is secured to the edge of the section 50. The flanges 67 and 69 are in the assembled position of the mold placed immediately adjacent each other or in contact, the edge of the flange 69 occupying the rabbet 68 aforesaid, and the flanges 70 and 71 of the angles 63 and 64 at right angles to the plates 51 and 50 are thus spaced apart by the combined width of the flanges 67 and 69. These flanges are provided with corresponding aligned holes 72 through which are passed bolts 73 to which tension is applied by means of nuts 74, drawing the angles and the edges of the plates together in assembled position. The buttons or latches 66 when swung into horizontal position, hold the parts in alignment as the bolts 73 hold them together.

By reference to Figures 4 and 5 it will be noticed that the joints between the plates 50, 52 and 51, 53 near the centres of the opposite long sides of the mold, are positioned by means of a tension bar 77 turned at right angles at the ends to form hooks 78 which are passed over the respective bolts 73 which close the joints on the opposite sides of the mold.

The finished vault is drawn or otherwise released from the mold by separating and removing the inside mold sections, and the construction of these sections 50, 51, 52 and 53, so that each comprises a portion of one side and one end makes the separation and removal of the sections of the inside mold comparatively easy of accomplishment.

An important feature of the invention resides in the manner of supporting the portion of the mold which forms the bottom of the vault, the metal plate which lines the bottom or floor of the vault forming part of the mold and the edges of the plate being embedded in the plastic material forming the sides or upright walls of the vault. The inner walls of the mold 50, 51, 52 and 53 on the long sides are braced by upright angles 79 secured to the sheet metal forming the walls at suitable intervals. The ends as shown are not reinforced otherwise than by the angles 63, 64 at the edges, the reference characters 63, 64 being applied to the opposite angles at all the meeting edges of the inner mold. The top edge of the inner mold wall is as previously described turned over these angles forming the flange 61, see particularly Figures 2, 4 and 6. These flanges 61 support the bottom plate 5 on all sides adjacent the edges 80 thereof, which are turned up, the plate extending beyond the inner wall of the mold on all sides, causing the flange 80 to be spaced inward from the inner wall of the mold and to be embedded in the plastic material forming the vault. The bottom plate is supported as to the central area thereof, i. e., the portion enclosed by the elongated rectangular figure formed by the flanges 61 by a removable grid 9 which in the structure shown is in turn supported by longitudinal angle irons 81 which receive the opposite elongated edges of the grid 9 and bear against the inner edges of flanges 61, the angles being in turn supported in the preferred form of the invention shown by pivoted latches or clips 82 on the upright angle irons 79, the same being pivoted on pins or rivets 83, one extending through the flange of each angle 79 which projects outward at right angles to the plates 50, 51, etc.

The grid 9, as shown, is made in two sections, but the details of the grid are immaterial. The latches support the angles 81 and the grid until the plastic material has hardened when the latches are thrown out of engagement, swinging into vertical position adjacent the angles 79, permitting the horizontal angles 81 and the grid 9 to fall, if this is done before the vault is turned from molding position to upright position, or otherwise permitting the grid and angles to be withdrawn without difficulty, leaving the bottom plate or lining 5 covering the bottom of the vault with its anchors or edge flanges 80 embedded in the plastic, forming the side walls of the vault.

The cover mold is illustrated in a general way and in detail in Figures 11, 12, 13 and 14. The illustration includes a steel plate 85 of convenient thickness and shape corresponding to the shape of the cover 4 but of dimensions slightly exceeding the length and width of the cover. The preferred form of the mold illustrated is formed by securing angle irons 86 to the edges of the plate, the angles 86 having comparatively narrow flanges 87 riveted to the plate 85, the edge of the flange registering with the edge of the plate along the end edges but being spaced inward to a slight degree at the sides, though the precise details are not of controlling importance in this connection. The other flange 88 of the angle iron 86 which extends upwardly at right angles to the plate 85 is of a width equalling the thickness of the completed cover of the vault. The flanges of the four angles 88 secured to the four edges of the rectangular plate 85 serve to enclose an area of dimensions equal to the corresponding dimensions of the cover. The angles 86 are, of course, placed with the upright flanges 88 toward the interior of the enclosure, so that flush rectangular molding surfaces only are presented within the mold, which is in the nature of a shallow elongated rectangular pan. To form the cover portion of the tongue and grooved joint, particularly the groove, the mold is provided with a rib or molding 89 secured to the bottom plate 85 just inside the side wall 88 and spaced therefrom by a suitable interval corresponding to the spacing of the rib on the top of the vault wall, the rib or molding 89 being extended entirely around the cover mold or pan parallel to the side wall 88 as aforesaid.

As shown, the member 89 is of semi-circular cross-section or half round, as such molding is frequently described. To strengthen the mold structure the edges are reinforced by means of angles 91 having one flange secured to the under-surface of the plate, the rivets or bolts 92 which hold the angles 86 being also passed through the angles 91. These latter angles 91 have flanges 93 projecting downwardly beneath the mold at right angles to the plate 85 and the plate is reinforced by cross-bars or straps 94 extending transversely across the plate on the bottom side and secured to it at intervals by rivets 95. These straps, as shown, are turned at right angles at the ends at 96, and these end portions overlie and are riveted to the depending flanges 93 by rivets 97. The cover mold structure is also strengthened by angular straps 99 in the corners secured to the respective flanges 93 of the angles 91 where they meet at the corners. The angles 91 are arranged after the manner of the angles 86 in that one extends across each end to the extreme lateral edge, and that the two angles at the lateral sides terminate at each end in contact with the surfaces of the flanges 93 of the end angles 91.

In operation the mold is first assembled as to the inside and outside walls, and the bottom frame, as shown, particularly in Figures 4, 5 and 6, all the joints described being closed and pins 41 and 58, Figure 4, being placed in position also tie rods 77. The grid 9 and the angles 91 at each side of the grid are then placed on the latches 82 which are swung up about their pivots 83 to the position in which they are shown in Figure 6. The bottom plate 5, which is to line the floor of the vault being made, is then placed on the grid overlying the flanges 61 on the upper edges of the inside walls 8 of the mold, the edge flange 80 of the plate 5 being spaced outwardly beyond the side walls and being in the preferred form, as shown, turned downwardly parallel to the inside wall 8 of the mold.

During the operation of molding the vault, the mold is supported on a suitable frame or gridding 100, see Figure 1, on a dolly jack or truck, and is placed with the opening 102, see Figure 4, upward, and the bottom frame 35 downward, so that the vault as formed is in inverted position. Any desired reinforce is placed in the mold.

The asphalt mastic having been heated under suitable conditions, as described in my Patents Nos. 1,560,106 and 1,560,107 patented Nov. 3, 1925, is then poured into the mold and permitted to harden.

The next operation to be performed after the mastic has hardened, is the removal of the mold parts. The latches 82 are thrown to vertical position, which operation may be accomplished by reaching under the mold. When the latches are released, the grid 9 and the angles 81 fall and may be removed when the mold is turned.

Referring now to Figure 1, the mold and its contents are hoisted several inches free of the grid or blocks 100, and it being noted that the eyes 25 are near the centres of the respective cross-bars 20 connecting the ends of the longitudinal channels 18 extending longitudinally on each side of the mold and secured to the side plates thereof, the manner of suspending the mold makes it very easy to rotate the latter about its longitudinal horizontal axis, and the next step consists in thus inverting it and lowering it again on to the blocks 100. If the grid 9 and the angle irons 81 have not already been removed, they can be removed now by throwing latches 82 and lifting out the members referred to. The tie rods 77 are then removed. The next step consists in removing the nuts 30 from the cross-rods 28, releasing the angle irons 29 which hold the side plates at the centre. Next the latches 66 are swung to vertical position. Next the nuts 74 are removed from the bolts 73 which hold the joints 65 connecting the plates 50, 51 and 52, 53. The pins 57 holding the inside walls in position, are then withdrawn, releasing the inside walls from the bottom frame 35. Then the edge of the plate 50 is swung inwardly until it avoids the edge of the plate 51 and the angle iron 63 secured to said edge. The section is thereby completely released and removed from the space within the mold member, it being understood that the remaining joints 65 have been similarly released, the removal of the inside mold is completed in the manner outlined.

The outside mold is now separated into sections, the first step being to remove the nuts on the ends of rods 24 which connect the longitudinal channels 18, and the next to remove the bolts 21 which pass vertically through the ends of the channels and the cross-bars 20. All of the pins 41 connecting the angles 17 to the base frame 35 having likewise been removed, the outside walls 10 on the long sides of the mold are removed and laid aside, and the end walls 11 being released by the removal of the side walls, which it will be remembered carry with them the angle irons 13 at the corners are likewise removed and the bottom frame 35 being thus completely disconnected and released is removed from the top edges of the completed vault.

The operation of molding the cover consists in coating the inside of the mold with powdered calcareous material to prevent sticking, it being understood that all inner mold surfaces are coated in this way prior to pouring, then placing the cover reinforce in the mold cavity, supporting it therein in the desired position and pouring the liquid heated mastic into the mold cavity about the reinforce. The important features of the invention reside in the mold structure, and in the manner of producing the asphalt vault with metal portions embedded therein.

I have thus described specifically and in detail a single embodiment of my invention in order that the nature and operation of the same may be clearly understood; however, the specific terms herein are used descriptively rather than in a limiting sense, the scope of the invention being defined in the claims.

What I claim is:

1. The method of producing an asphalt burial vault with a metallic floor which consists in providing an external mold enclosure open at the top and an internal mold structure also open at the top and spaced below the outside mold, placing a metal plate which is to form the floor of the vault on the top of the inside mold, extending beyond the same, pouring a mixture of heated bituminous mastic into the mold, permitting the same to harden, and removing the mold structure.

2. The method of producing an asphalt burial vault with a metallic floor which consists in providing an external mold enclosure open at the top and an internal mold structure also open at the top and spaced below the outside mold, placing a metal plate which is to form the floor of the vault on the top of the inside mold, extending beyond the same, providing a support for the central portion of the plate inside the mold walls, pouring a mixture of heated bituminous mastic into the mold, permitting the same to harden, removing the support for the central portion of the bottom plate, and removing the mold structure.

3. The method of producing an asphalt burial vault with a metallic floor which consists in providing an external mold enclosure open at the top and an internal mold structure also open at the top and spaced below the outside mold, placing a metal plate which is to form the floor of the vault on the top of the inside mold, extending beyond the same, providing a support for the central portion of the plate inside the mold walls, pouring a mixture of heated bituminous mastic into the mold, permitting the same to harden, inverting the mold and the vault therein, removing the support and the mold structure.

4. The combination in a mold for the manufacture of an asphalt vault of an outer mold wall open at the top, an inner mold wall also open at the top and terminating below the level of the outer wall, a support for a floor lining plate resting in the opening in the inner mold, and said floor lining plate adapted to form a part of the finished vault structure and forming a wall of the mold and now conveniently separable from the mold.

5. The combination in a mold for the manufacture of an asphalt vault, of an outer mold wall open at the top, an inner mold wall also open at the top and terminating below the level of the outer wall, a support for a floor lining plate resting in the opening in the inner mold and said floor lining plate, said plate forming part of the finished vault and forming a temporary wall of the mold from which it is conveniently separable, said plate having anchoring means projecting into the mold space.

6. The combination in a mold for the manufacture of an asphalt vault of an outer mold wall open at the top, an inner mold wall also open at the top and terminating below the level of the outer wall, a support for a floor lining plate resting in the opening in the inner mold and said floor lining plate which is adapted to form the floor of the finished vault, the floor lining plate forming a wall of the mold from which it is conveniently separable, said plate resting on the inner mold wall and projecting beyond the same into the mold space.

7. A mold for an asphalt vault, consisting of a bottom frame having a central raised portion extending around the entire frame, inside and outside walls for said mold having flanges extending along their lower edges and resting on and secured to said bottom frame at each side of said raised portion which serves to position the mold walls, means for removably securing the flanges to the bottom frame, the inside and the outside walls being formed in separable sections for convenience in removing, both the inside and the outside mold walls being open at the top, a support, means for temporarily fastening the same in the opening of the inside mold at the top, a plate resting on the support and separable therefrom and forming the top wall of the mold, the plate also forming a part of the finished product and being adapted to serve as a lining or floor for the bottom of the vault.

8. A mold for an asphalt vault consisting of a bottom frame having a central raised portion extending around the entire frame, inside and outside walls for said mold at each side of said raised portion which serves to position the mold walls, means for removably securing the side walls to the bottom frame, the inside and the outside walls being formed in separable sections for convenience in removing, both the inside and the outside mold walls being open at the top, a support, means for temporarily fastening the same in the opening of the inside mold at the top, a plate adapted to form part of the finished mold, and to serve as a lining or floor for the bottom of the vault resting on said support, and conveniently separable from the mold, longitudinal supports for the outside walls of the mold, one on each side of the mold extending the length of the mold and beyond the ends and secured to said side walls intermediately of their vertical dimension, removable means connecting said supports at the ends, and means for supporting said mold and its contents at each end of said longitudinal supports including a longitudinal horizontal pivot at each end intermediate of said longitudinal supports.

9. A mold for the manufacture of an asphalt vault consisting of an outer wall member made in demountable sections, a bottom frame and an inner wall member, the inner wall member being made in four sections meeting intermediately of the sides, and means for joining said sections consisting of angle irons secured to the meeting edges on the inside, i. e., away from the mold space, one angle iron being spaced back from the edge and the other angle iron overlapping the edge, means for drawing the projecting flanges of the angle irons together, a button pivoted to one angle iron and engaging the overlapping angle iron.

10. A mold for the manufacture of an asphalt vault consisting of an outer wall member made in demountable sections, a bottom frame and an inner wall member, the inner wall member being made in four sections meeting intermediately of the sides, and means for joining said sections consisting of angle irons secured to the meeting edges on the inside, i. e., away from the mold space, one angle iron being spaced back from the edge and the other angle iron overlapping the edge, means for drawing the projecting flanges of the angle irons together, a button pivoted to one angle iron and engaging the overlapping angle iron, and a tension member connecting the joints on the opposite sides of the mold.

11. A mold for the manufacture of asphalt grave vaults consisting of an outer wall member made in demountable sections, a bottom frame and an inner wall member, means for securing the walls to the bottom frame, the inner wall member being made in sections, meeting intermediately of the sides, means for joining the latter sections consisting of elongated flanged members secured to the respective meeting edges of the inside mold members on the inside with their flanges parallel and projecting away from the mold space and spaced back from the edges of the sections, and means engaging the projecting flanges for drawing the edges together to secure the sections in molding position.

12. A mold for the manufacture of asphalt grave vaults consisting of an outer wall member made in demountable sections, an inner wall member also made in sections, means for closing the bottom of the mold, means for securing the respective sections together, supporting means comprising longitudinal members one on each long side of the mold, the supporting means being longer than the mold and projecting beyond the mold at each end, transverse members connecting the respective ends of the longitudinal members, and a swivel secured to a central point of each transverse member, the swivels having their axes parallel to the length of the mold.

13. The method of producing an asphalt burial vault with a metallic floor which consists in providing an external mold having an opening at the top for pouring and an internal mold structure spaced below the outside mold, placing a metal plate which is to form the floor of the mold, on top of the inside mold, the plate being provided with anchoring means projecting into the mold space, pouring a mixture of heated bituminous mastic into the mold, permitting the same to harden, whereby the metal floor plate becomes embedded in and secured to the bituminous material, removing the sides and bottom of the mold, leaving the floor plate integral with the completed vault, the vault being thus poured in inverted position.

14. The method of making an asphalt vault with a metal inside wall covering which consists in providing a mold having a cavity of the dimensions of the finished product, inserting the wall covering in the form of a metal plate in the mold so that it forms a wall of the mold and projects beyond the corresponding portion of the mold at the edges, pouring the heated asphaltic material into the mold whereby the edges of the plate become embedded in the asphaltic material, removing the mold proper, leaving the plate embedded in the finished structure, forming an inside wall covering.

15. The method of producing an asphalt burial vault with a metallic inner wall covering which consists in providing a mold having a cavity adapted to produce the desired form and size of vault, placing a metallic plate in the mold so that it forms one wall of the mold, the plate having anchoring means projecting into the mold cavity, pouring the melted asphaltic material into the mold cavity, removing the mold structure, the plate being thus caused to adhere to an inner wall of the vault.

Signed by me at Baltimore, Maryland, this 22nd day of May, 1924.

WILLIAM E. SHEENE.